(12) United States Patent
Komura et al.

(10) Patent No.: US 8,243,558 B2
(45) Date of Patent: Aug. 14, 2012

(54) THERMALLY ASSISTED MAGNETIC HEAD, HEAD GIMBAL ASSEMBLY, AND HARD DISK APPARATUS

(75) Inventors: Eiji Komura, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 868 days.

(21) Appl. No.: 12/363,053

(22) Filed: Jan. 30, 2009

(65) Prior Publication Data

US 2009/0201600 A1  Aug. 13, 2009

(30) Foreign Application Priority Data

Feb. 8, 2008 (JP) .................. P2008-029303

(51) Int. Cl.
*G11B 11/00* (2006.01)

(52) U.S. Cl. ............... 369/13.33; 369/13.03; 369/13.24; 369/13.32; 360/125.31

(58) Field of Classification Search .......... None
See application file for complete search history.

(56) References Cited

U.S. PATENT DOCUMENTS

| | | | |
|---|---|---|---|
| 6,795,630 B2 * | 9/2004 | Challener et al. ............ | 385/129 |
| 7,027,700 B2 * | 4/2006 | Challener ..................... | 385/129 |
| 7,330,404 B2 * | 2/2008 | Peng et al. .................. | 369/13.33 |
| 7,791,839 B2 * | 9/2010 | Olson et al. ............. | 360/125.31 |
| 7,911,882 B2 * | 3/2011 | Shimazawa et al. ........ | 369/13.33 |
| 7,911,883 B2 * | 3/2011 | Sasaki et al. ............... | 369/13.33 |
| 8,045,422 B2 * | 10/2011 | Komura et al. ............. | 369/13.33 |
| 8,077,558 B1 * | 12/2011 | Tsutsumi et al. ........... | 369/13.33 |
| 8,077,559 B1 * | 12/2011 | Miyauchi et al. .......... | 369/13.33 |
| 8,125,857 B2 * | 2/2012 | Tanaka et al. .............. | 369/13.33 |
| 8,125,858 B2 * | 2/2012 | Hara et al. ................. | 369/13.33 |
| 8,139,447 B2 * | 3/2012 | Sasaki et al. ............... | 369/13.33 |
| 8,179,628 B2 * | 5/2012 | Zhou et al. ..................... | 360/59 |
| 2006/0187564 A1 | 8/2006 | Sato et al. | |
| 2010/0260015 A1* | 10/2010 | Sasaki et al. .............. | 369/13.02 |
| 2011/0058272 A1* | 3/2011 | Miyauchi et al. ............... | 360/59 |
| 2011/0228420 A1* | 9/2011 | Hara et al. ....................... | 360/59 |
| 2011/0242703 A1* | 10/2011 | Sasaki et al. ............... | 360/245.3 |
| 2011/0303637 A1* | 12/2011 | Araki et al. ..................... | 216/24 |
| 2012/0008229 A1* | 1/2012 | Zhou et al. ..................... | 360/59 |

FOREIGN PATENT DOCUMENTS

| | | | |
|---|---|---|---|
| JP | A-2005-4901 | | 1/2005 |
| JP | A-2006-185548 | | 7/2006 |
| JP | 2006351091 A | * | 12/2006 |
| JP | A-2006-351091 | | 12/2006 |

* cited by examiner

*Primary Examiner* — Kevin Bernatz

(74) *Attorney, Agent, or Firm* — Oliff & Berridge, PLC

(57) ABSTRACT

A thermally assisted magnetic head includes a main magnetic pole for writing and a near-field light generator provided near the main magnetic pole, the near-field light generator having a non-magnetic base metal layer, a non-magnetic upper metal layer, an intermediate insulating layer interposed between the base metal layer and the upper metal layer, and the base metal layer having a V-shaped groove and also the upper metal layer having a projection facing the deepest part in the groove of the base metal layer, in a vertical cross-section parallel to a medium facing surface.

4 Claims, 18 Drawing Sheets

THERMALLY ASSISTED MAGNETIC HEAD, HEAD GIMBAL ASSEMBLY, AND HARD DISK APPARATUS

BACKGROUND OF THE INVENTION

1. Field of the Invention

The present invention relates to a thermally assisted magnetic head, a head gimbal assembly, and a hard disk apparatus, which are particularly capable of generating near-field light in spite of a simple structure and capable of thermally assisted magnetic recording using the near-field light.

2. Related Background of the Invention

When irradiated with laser light, a nano-order microscopic metal body generates near-field light by a metal atom resonance. By disposing a magnetic recording region in the vicinity of this near-field light it is possible to heat the magnetic recording region and to reduce the coercive force thereof A magnetic head, which performs recording of magnetic information into a recording medium by introducing a magnetic flux from a main magnetic pole into the magnetic recording region in this state, is known as a so-called thermally assisted magnetic head (e.g., Japanese Patent Application Laid-Open Publication No. 2006-185548). Since miniaturization of the magnetic recording region increases a coercive force, it is effective to use such a thermally assisted magnetic head for improving recording density.

However, there is a problem that an apparatus using a laser light source such as one disclosed in the above patent document becomes complicated.

The present invention has been achieved in view of such a problem, and aims for providing a thermally assisted magnetic head, a head gimbal assembly, and a hard disk apparatus capable of high-density recording, which are capable of generating near-field light in spite of a simple structure and capable of thermally assisted magnetic recording using the near-field light.

SUMMARY OF THE INVENTION

A thermally assisted magnetic head according to the present invention includes a main magnetic pole for writing; and a near-field light generator provided near the main magnetic pole, wherein the near-field light generator includes: a first metal layer; a second metal layer; and an insulating layer interposed between the first metal layer and the second metal layer, the first metal layer having a V-shaped recess and also the second metal layer having a projection facing the deepest part in the recess of the first metal layer, in a vertical cross-section parallel to a medium facing surface.

Current flow between the first metal layer and the second metal layer of the near-field light generator generates plasmons at interfaces between these layers and the insulating layer Here, the near-field light generator of the thermally assisted magnetic head according to the present invention employs a structure in which the first metal layer has the V-shaped recess and also the second metal layer has the projection facing the deepest part in the recess of the first metal layer in a vertical cross-section parallel to a medium facing surface. Therefore, the generated plasmon can be localized at the medium facing surface. Accordingly, it is possible to generate the near-field light at the medium facing surface and to perform the thermally assisted magnetic recording using this near-field light. This structure is so simple to have an advantage of making the apparatus smaller and making the design thereof easier.

Further, the recess of the first metal layer is a groove, and the deepest part of this groove extends from the medium facing surface toward the inside of the thermally assisted magnetic head and an end of the groove on the opposite side of the medium facing surface is provided with a step.

Thereby, the plasmon generated at the interface between the first metal layer and the insulating layer is reflected by the step provided at the end of the groove on the opposite side of the medium facing surface, and has a higher probability of localizing at one end of the groove on the medium facing surface side. Accordingly, it is possible to improve generation efficiency of the near-field light by employing such a structure.

A head gimbal assembly according to the present invention includes the above thermally assisted magnetic head, and a suspension to which the thermally assisted magnetic head is attached. Since the thermally assisted magnetic head has the near-field light generator in the present head gimbal assembly, it is possible to perform a higher density recording by mounting this assembly to a hard disk apparatus. Further, a simple structure enables the head gimbal assembly to have an advantage of making the apparatus smaller and making the design thereof easier.

A hard disk apparatus according to the present invention includes the above described head gimbal assembly and a magnetic recording medium facing one end surface of the thermally assisted magnetic head. Using the above hard disk apparatus, a higher heating efficiency of the thermally assisted magnetic head in the head gimbal assembly allows magnetic particles having a higher coercive force to be used for the magnetic recording medium, and thereby it is possible to perform higher density writing.

By employing the thermally assisted magnetic head according to the present invention, it is possible to generate the near-field light in spite of the simple structure and to realize the thermally assisted magnetic recording using the near-field light, and by employing the head gimbal assembly and the hard disk apparatus mounting this magnetic head, it is possible to perform the high density magnetic recording, resulting in performing large capacity information recording.

DESCRIPTION OF THE PREFERRED EMBODIMENTS

Figure 1:
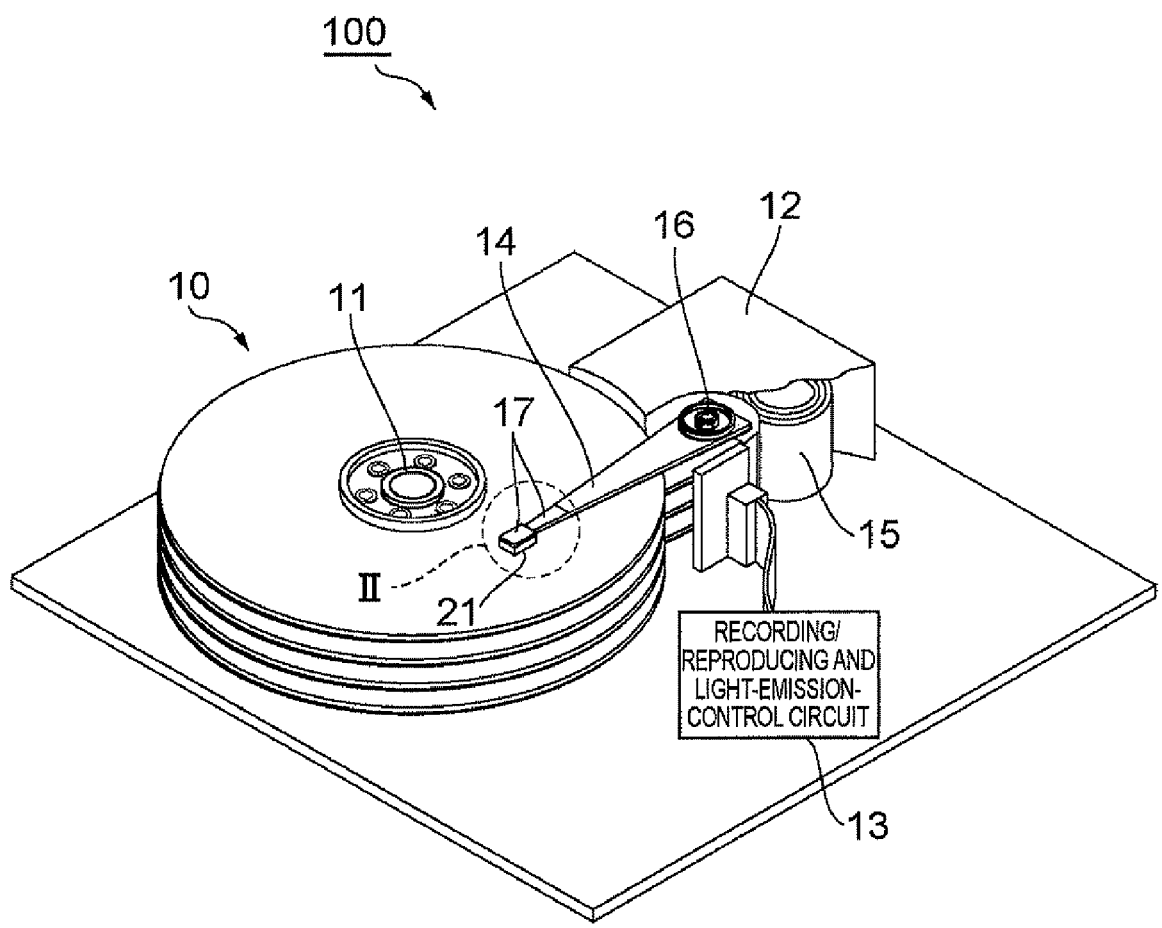
FIG. 1 is a perspective view of a hard disk apparatus according to an embodiment.

Hereinafter, there will be described a thermally assisted magnetic head, a head gimbal assembly, and a hard disk apparatus according to an embodiment. The same element is denoted by the same symbol and repeated explanation will be omitted.

A hard disk apparatus 100 includes magnetic disks 10 which are a plurality of magnetic recording media rotating around a rotating axis of a spindle motor 11, an assembly carriage device 12 for positioning a thermally assisted magnetic head 21 onto a track, and a recording/reproducing and light-emission-control circuit 13 for controlling write and read operation of this thermally assisted magnetic head 21 and further for controlling current or the like of the thermally assisted magnetic recording which will be described in detail hereinafter.

The assembly carriage device 12 is provided with a plurality of drive arms 14. These drive arms 14 can be swung around a central pivot bearing axis 16 by a voice coil motor (VCM) 15 and layered in the direction along this axis 16. To the head of each drive arm 14 is attached a head gimbal assembly (HGA) 17. To each of the HGAs 17, the thermally assisted magnetic head 21 is provided so as to face each surface of the magnetic disks 10. A surface thereof facing the surface of the magnetic disk 10 is a medium facing surface S (also called air bearing surface: refer to FIG. 2) of the thermally assisted magnetic head 21. Note that the number of the magnetic disks 10, the drive arms 14, the HGAs 17, and the thermally assisted magnetic heads 21 may be also singular.

Figure 2:
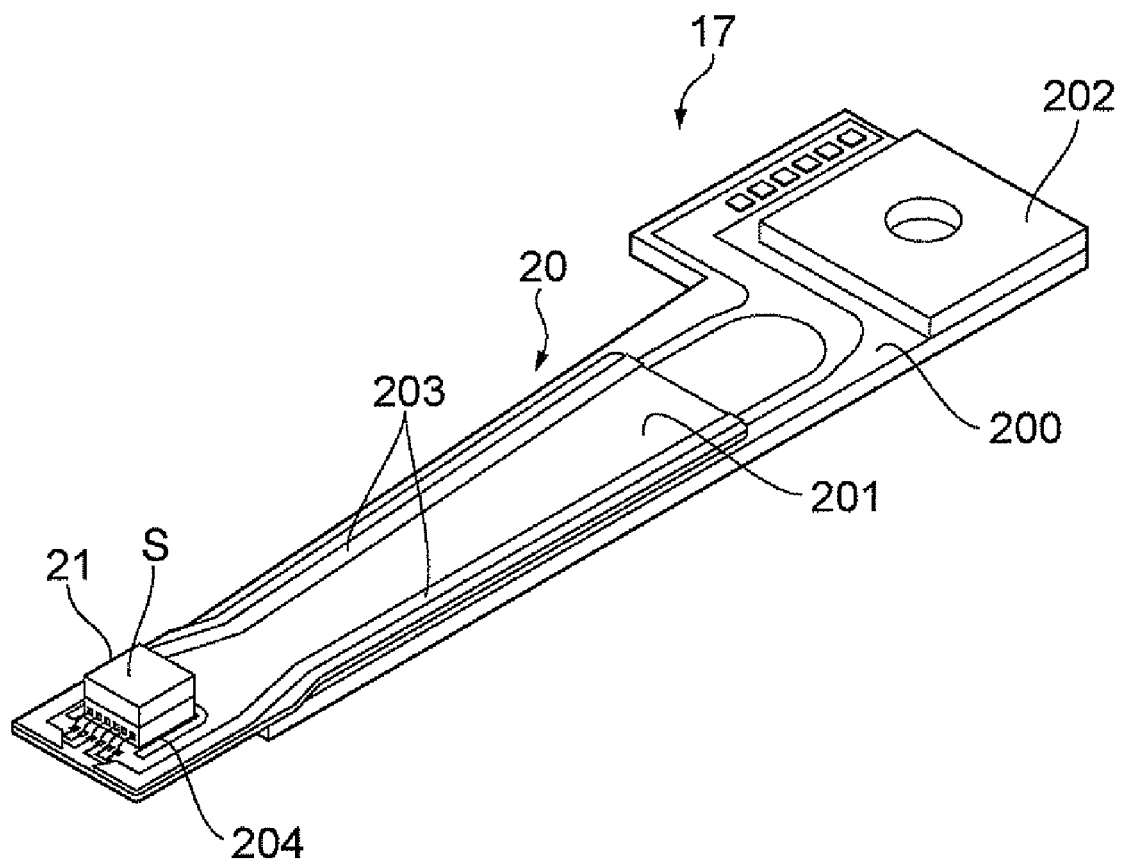
FIG. 2 is a perspective view of an HGA17.

FIG. 2 is a perspective view of the HGA 17. This diagram shows the medium facing surface S of the HGA 17 upward.

The HGA 17 is configured with the thermally assisted magnetic head 21 fixed to the head of the suspension 20, and a wiring member 203, one end of which is electrically connected further to a terminal electrode of the thermally assisted magnetic head 21. The suspension 20 is mainly configured with a load beam 200, a flexure 201 which is fixed and supported on this load beam 200 and has elasticity, a tongue part 204 formed like a plate spring on the head of the flexure, a base plate 202 provided at the base of the load beam 200, and the wiring member 203 which is provided on the flexure 201 and composed of a lead conductor and connection pads electrically connected to the both ends thereof.

Note that apparently the suspension structure in the HGA 17 is not limited to the above described structure. Further, although not shown in the drawing, a head drive IC chip may be mounted somewhere along the suspension 20.

Figure 3:
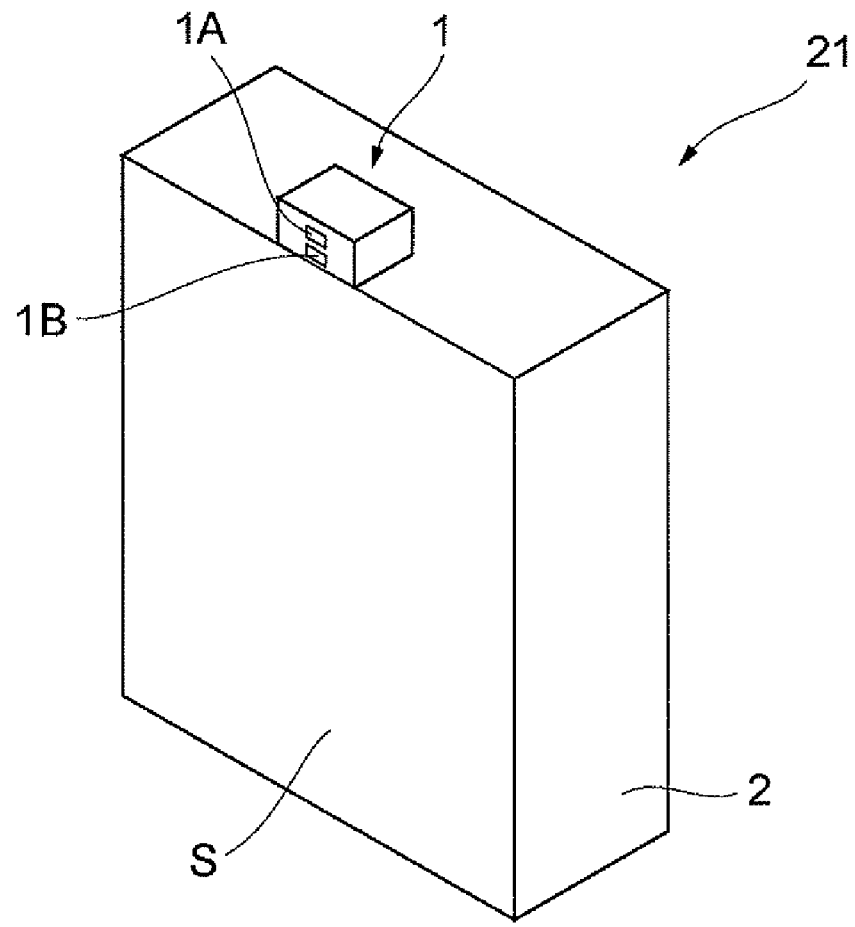
FIG. 3 is a perspective view of a thermally assisted magnetic head 21.
Figure 3:
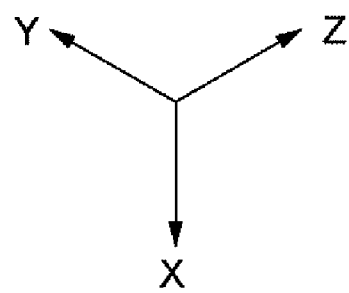

FIG. 3 is a perspective view of the thermally assisted magnetic head 21.

On one end of a slider substrate 2 is fixed a magnetic head part 1. On the medium facing surface S of the slider substrate, a pattern, which is not shown in the drawing, is formed for floating the magnetic head stably during the rotation of the magnetic disk. The slider substrate 2 is made of AlTiC ($Al_2O_3$—TiC), for example. When a substrate having a high thermal conductivity is used for the slider substrate 2, the substrate becomes to have a heat dissipation function.

The magnetic head part 1 is provided with a main magnetic pole (write element) 1A for magnetic information and a magneto-resistance effect element (MR element) 1B which is a read-out element of the magnetic information. A head of the main magnetic pole 1A and a magnetically sensitive surface of the MR element 1B are positioned on the same side as the medium facing surface S. The arrangement direction of the main magnetic pole 1A and the M element 1B is along the track of the magnetic disk 10, and the width direction perpendicular to the arrangement direction in the medium facing surface S is the track width direction. When the XYZ orthogonal coordinate system is set as shown in the drawing, the above arrangement direction coincides with the X axis direction and the track width direction coincides with the Y axis direction.

Hereinafter, various embodiments of the magnetic head part 1 will be described.

Figure 4:
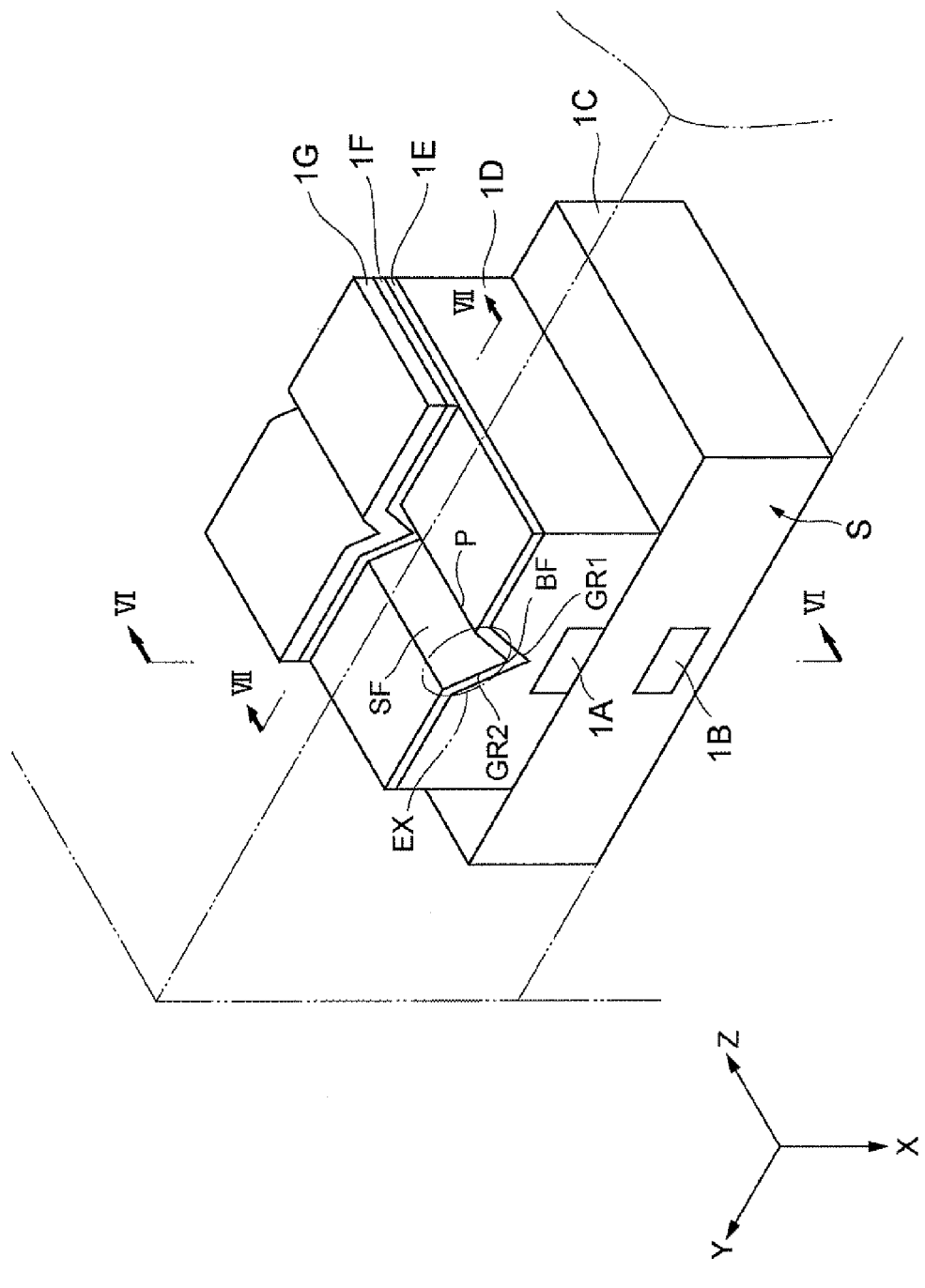
FIG. 4 is an enlarged perspective view showing a first embodiment of the magnetic head part 1 shown in FIG. 3.
Figure 5:
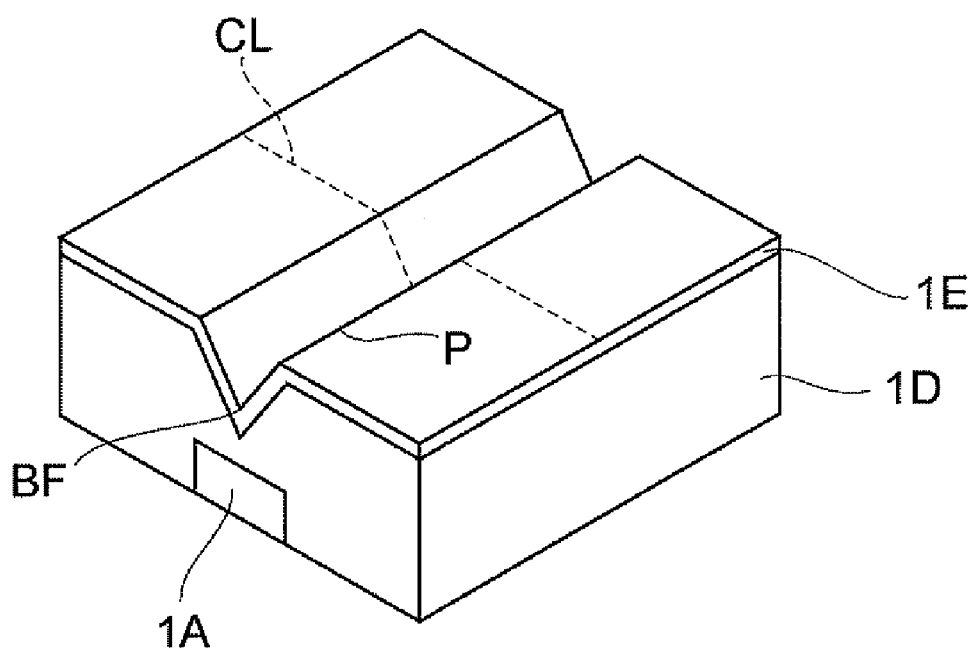
FIG. 5 is a perspective view of the magnetic head part 1 according to FIG. 4 during production.
Figure 6:
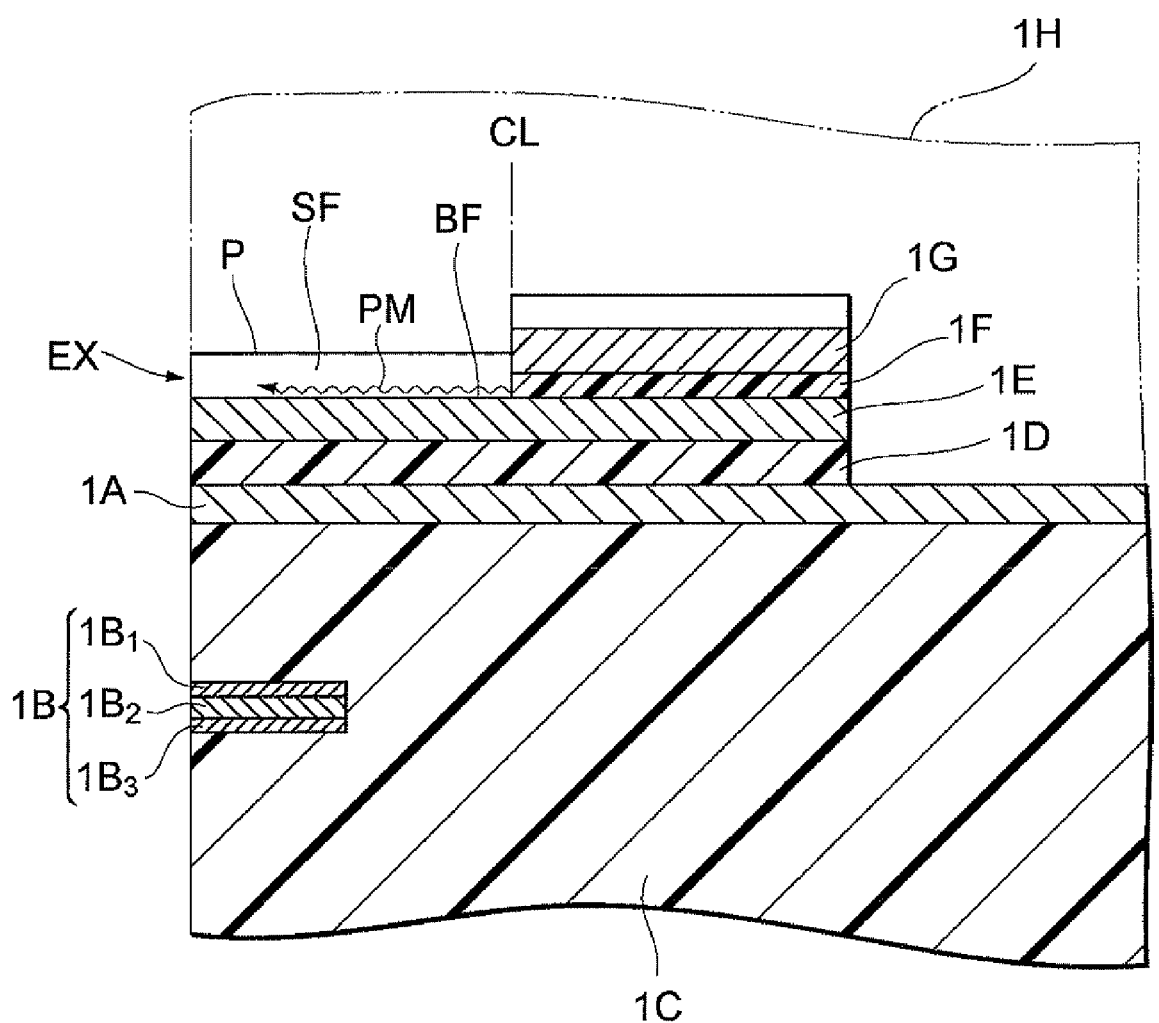
FIG. 6 is a cross-sectional view taken along the cross-section indicated by the arrows VI-VI in the magnetic head part 1 shown in FIG. 4.
Figure 7:
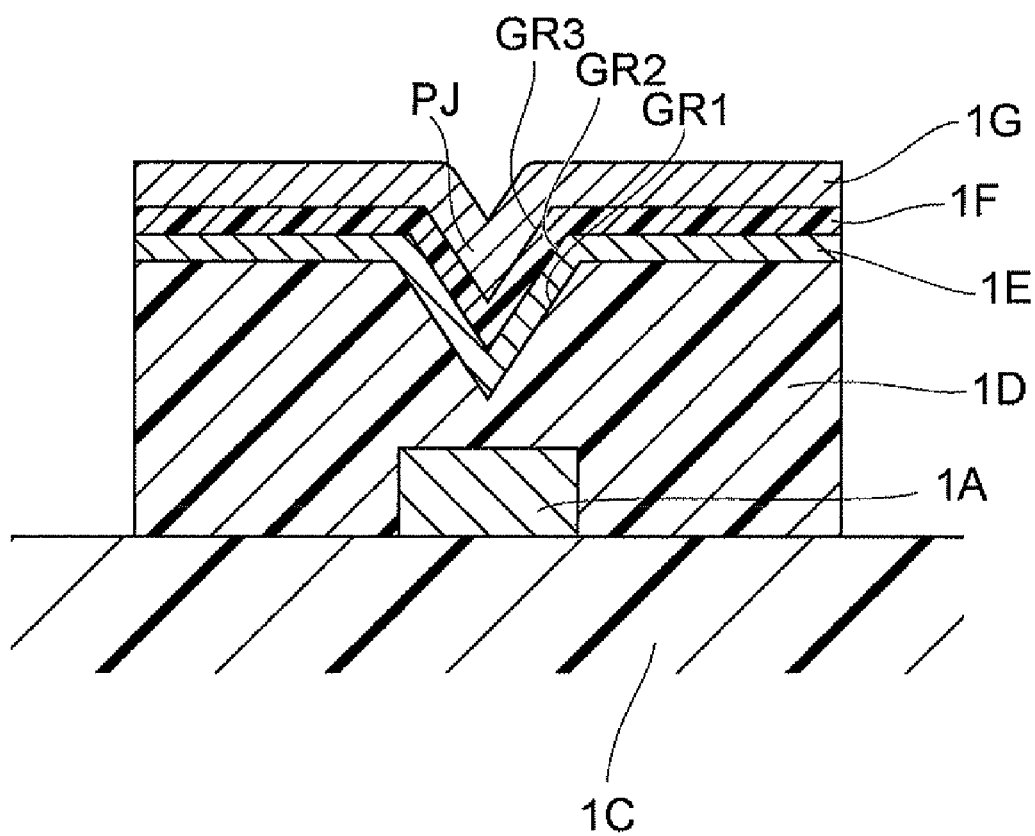
FIG. 7 is a cross-sectional view taken along the cross-section indicated by the arrows VII-VII in the magnetic head part 1 shown in FIG. 4.
Figure 8:
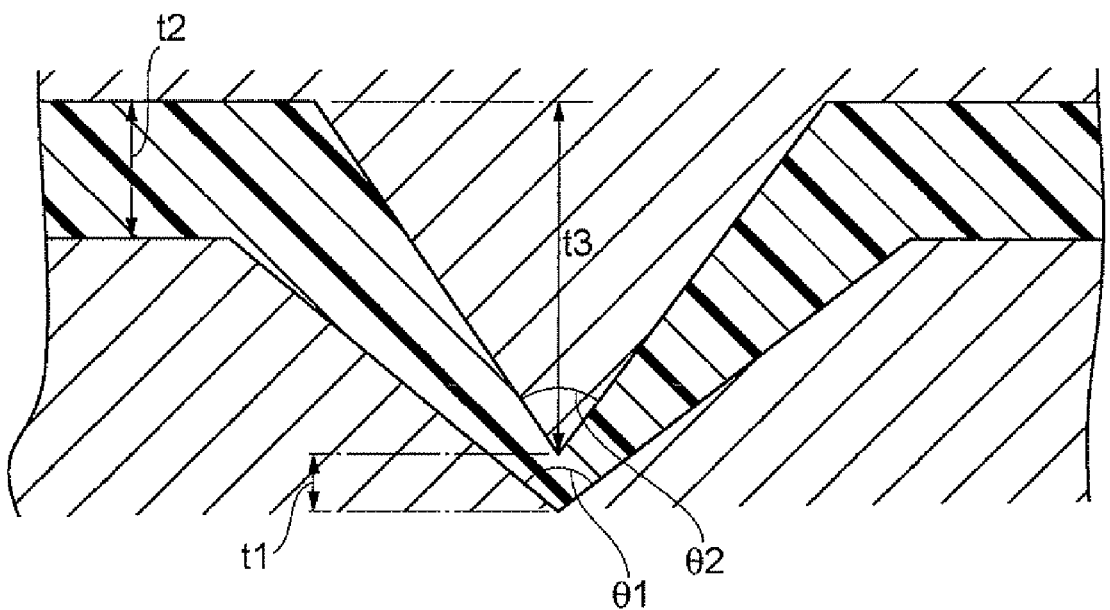
FIG. 8 is an enlarged view of the near-field light generator shown in FIG. 7.

(First embodiment) FIG. 4 is an enlarged perspective view showing a first embodiment of the magnetic head part 1 shown in FIG. 3, and FIG. 5 is a perspective view of the magnetic head part during production. FIG. 6 and FIG. 7 are cross-sectional views taken along the cross-section indicated by the arrows VI-VI and the cross-section indicated by the arrows VII-VII, respectively, in the magnetic head part 1 shown in FIG. 4. FIG. 8 is an enlarged view showing the neighborhood of the V-shaped groove (recess) in the near-field light generator of FIG. 7.

On the YZ surface of the slider substrate 2 are sequentially layered a lower insulating layer 1C, an upper insulating layer 1D, a non-magnetic base metal layer (first metal layer) 1E, an intermediate insulating layer 1F, a non-magnetic upper metal layer (second metal layer) 1G, and a protection layer 1H. Note that the protection layer 1H is shown by imaginary lines in the drawing for illustrating the internal structure clearly.

The M element 1B is embedded in the lower insulating layer 1C, and the MR element 1B is composed of an upper shield electrode 1B1, a lower shield electrode 1B3, and a MR element film 1B2 interposed between the upper shield electrode 1B1 and the lower shield electrode 1B3, as shown in the cross-sectional view of FIG. 6. The M element film 1B2 in the present example is a TMR element film having a tunnel barrier layer interposed between a free layer and a fixed layer. Note that also a GMR element may be employed for the MR element 1B.

The main magnetic pole 1A is embedded in the upper insulating layer 1D. The main magnetic pole 1A extends in parallel to the Z axis direction, and a magnetic flux is introduced into the main magnetic pole 1A from an information writing coil (coil L in FIG. 18) which is not shown in the drawing. Therefore, the magnetic flux extends toward the medium side from the head of the main magnetic pole 1A which is exposed on the medium facing surface S. On the upper surface of the upper insulating layer 1D is formed a V-shaped groove GR1 which extends linearly in parallel to the Z axis direction, and the deepest part of the groove GR1 is positioned above the main magnetic pole 1A.

The near-field light generator is positioned above the upper insulating layer 1D. The near-field light generator is provided with the base metal layer 1E, the upper metal layer 1G, and the intermediate insulating layer 1F interposed between the metal layers 1E and 1G. As shown in FIG. 7, in the vertical cross-section parallel to the medium facing surface S inside the thermally assisted magnetic head 1 than a coverage line CL shown in FIG. 5, the base metal layer 1E has a V-shaped groove GR2 extending linearly in parallel to the Z axis direction. The deepest part BF of the groove GR2 has the same center axis as that of the groove GR1 of the upper insulating layer 1D. The upper metal layer 1G has a projection PJ facing the deepest part in the groove GR2 of the base metal layer 1E.

FIG. 8 is an enlarged view showing the neighborhood of the V-shaped groove GR2 in FIG. 7. The intermediate insulating layer 1F has a thickness of t1 at the deepest part BF in the groove GR2 and has a thickness of t2 larger than the thickness t1 in an outer flat portion continuous with the groove GR2. An angle made by both side surfaces SF is θ1 at the deepest part BF in the V-shaped groove GR2 of the base metal layer 1E and an angle made by both side surfaces is θ2 at the deepest part on the upper surface of the intermediate insulating layer 1F. As shown in FIG. 8, θ1 is larger than θ2. The projection PJ, which faces the deepest part of the groove GR2, has a height of t3.

Figure 17:
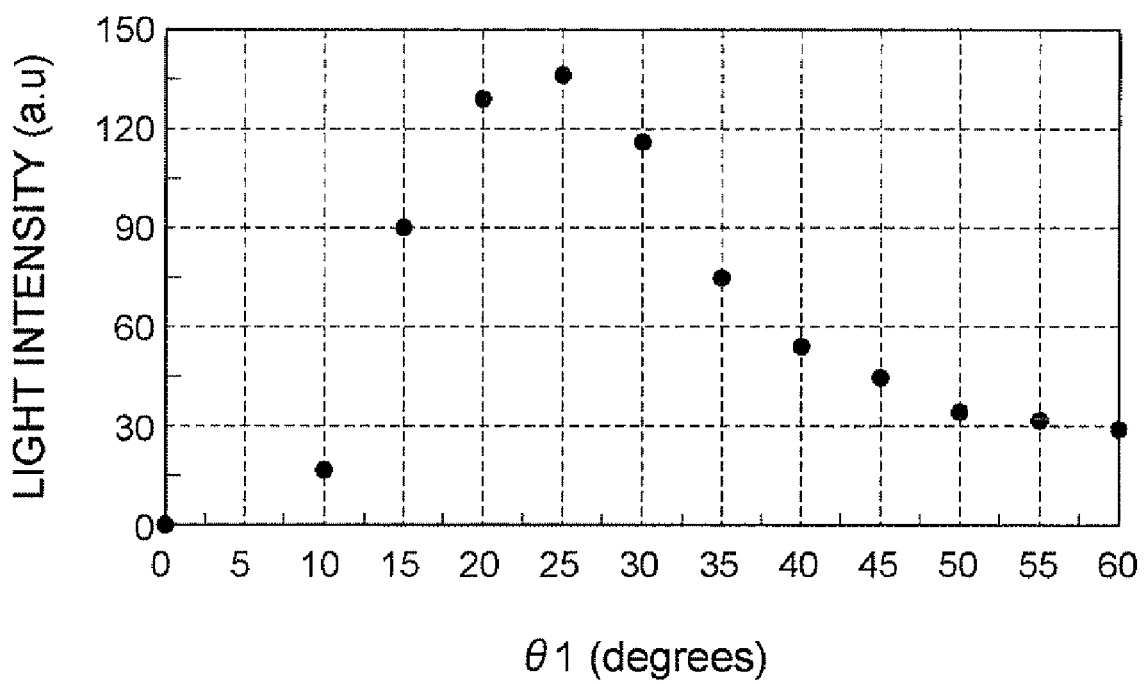
FIG. 17 is a graph showing a relationship between an angle θ1 (degree) and light intensity (a. u).

FIG. 17 is a graph showing a relationship between the θ1 (degree), the angle made by the both sides SF composing the V-shaped groove GR2, and light intensity (a. u.) in a case in which the base metal layer 1E is made of Ag. Between the deepest part BF of the groove GR2 and the projection PJ, a gap plasmon having a small transmission loss is generated and the near-field light is emitted. The light intensity of near-field light increases gradually as the angle θ1 increases from zero degree, becomes maximum when the angle θ1 is equal to 25 degrees, and then the light intensity decreases gradually when the angle θ1 further increases and tends to be saturated when the angle θ1 is 50 degrees or larger. As apparent from this graph, a high light intensity is obtained in the case of 15 degrees≦θ1≦35 degrees and a still higher light intensity is obtained in the case of 20 degrees≦θ1≦30 degrees.

Note that, while the above metal layer and insulating layer are formed by using a sputtering method or the like, the upper metal layer 1G tends to be embedded incompletely in the groove GR3 which is made by the surface of the intermediate insulating layer 1F formed on the groove GR2, when the angle θ1 is smaller than 15 degrees.

From the coverage line CL to the medium facing surface S, the base metal layer 1E, which has the V-shaped groove GR2 in the near-field light generator, extends continuously. That is, the V-shaped groove GR2 extends linearly from the coverage line CL to the medium facing surface S and the groove GR2 is made open at the end on the opposite side of the medium facing surface S.

The current flowing between the base metal layer 1E and the upper metal layer 1G generates the plasmons PM at the interface between these layers and the intermediate insulating layer 1F. Since the base metal layer 1E, which has the V-shaped groove GR2, extends continuously from the coverage line CL to the medium facing surface S, the plasmon PM generated at the interface between the base metal layer 1E and the intermediate insulating layer 1F is reflected partially at an edge of the end on the opposite side of the medium facing surface S, and can travel toward the exit portion EX and reach the exit portion EX to be localized there. Therefore, the near-field light is generated at the exit portion EX. Further, the near-field light, which is generated at the exit portion EX positioned at one end of the groove GR2, has the strongest emission of the near-field light in the vicinity of the deepest part BF. That is, a part facing the deepest part BF is a main part having a heat effect in the thermal assist effect which heats a recording layer portion of the magnetic disk with light.

Note that this magnetic head is produced in the following process as shown in FIG. 5. After the V-shaped groove GR1 is formed on the surface of upper insulating layer 1D using a photolithography technique, the base metal layer 1E, the intermediate insulating layer 1F, and the upper metal layer 1G are deposited sequentially using a sputtering method or the like. Then, the intermediate insulating layer 1F and the upper metal layer 1G are etched in the region on the side of the exit potion EX than the coverage line CL using an ion-milling or RIE (reactive ion etching) method. Finally, by deposition of the protection layer 1H on the base metal layer 1E and the upper metal layer 1G the structure shown in FIG. 4 can be obtained.

As described above, the above described thermally assisted magnetic head is provided with the near-field light generator having the base metal layer 1E, the upper metal layer 1G, and the intermediate insulating layer 1F interposed between the metal layers 1E and 1G, and the base metal layer 1E has the V-shaped groove (recess) GR2 and also the upper metal layer 1G has the projection PJ facing the deepest part in the groove of the base metal layer 1E, in the region on the opposite side of the exit portion EX than the coverage line CL, in the vertical cross-section parallel to the medium facing surface S. Further, only the base metal layer 1E, which has the V-shaped groove GR2, extends from the coverage line CL to the medium facing surface S in the near-field light generator. That is, the V-shaped groove GR2 extends linearly from the coverage line CL to the medium facing surface S and the groove GR2 is made open at the end on the opposite side of the medium facing surface S.

Accordingly, input energy such as current or the like provided to the near-field light generator generates the plasmon PM at the interface between the base metal layer 1E and the intermediate insulating layer 1F, and the generated plasmon PM is reflected partially at the edge of the end on the opposite side of the medium facing surface S, and can travel toward the exit potion EX and reach the exit portion EX to be localized there. Thereby, the near-field light is generated at the exit portion EX.

Further, the near-field light generated at the exit portion EX positioned at one end of the groove GR2 has the strongest emission of the near-field light in the vicinity of the deepest part BF. Then, the recording layer portion of the magnetic disk, which faces the deepest part BF, is heated effectively with the strong near-field light and the coercive force thereof becomes weaker. Accordingly, it is possible to perform the thermally assisted magnetic recording by using the strong near-field light emitted in the vicinity of the deepest part BF in the exit portion EX. This structure is so simple to have an advantage of making the apparatus smaller and making the design thereof easier Here, a material and a thickness which can be used for each of the layers are as follows, Insulating layer 1C:
Material: $Al_2O_3$, $SiO_2$, AlN, $TiO_2$, $Ta_2O_5$, MgO, and ZnO
Thickness: 1 μm or larger and 50 μm or smaller Insulating layer 1D:
Material: $Al_2O_3$, $SiO_2$, AlN, $TiO_2$, $Ta_2O_5$, MgO, and ZnO
Thickness: 5 nm or larger and 500 nm or smaller Metal layer 1E:
Material: Ag, Au, Al, Cu, Pd, Pt, In, Ir, Rh, and Ru
Thickness: 5 nm or larger and 500 nm or smaller Insulating layer 1F:

Material: Al₂O₃, SiO₂, AlN, TiO₂, Ta₂O₅, MgO, and ZnO
Thickness: 0.5 nm or larger and 10 nm or smaller
  Metal layer 1G:
Material: Ag, Au, Al, Cu, Pd, Pt, In, Ir, Rh, and Ru
Thickness: 5 nm or larger and 500 nm or smaller
  Protection layer 1H:
Material: Al₂O₃, SiO₂, AlN, TiO₂, Ta₂O₅, MgO, and ZnO
Thickness: 1 μm or larger and 50 μm or smaller
  Main magnetic pole 1A:
Material: NiFe, FeCo, FeNiCo, and FeCo/Ru multilayer film
Thickness: 0.2 μm or larger and 1 μm or smaller Further, the distance, which the plasmon is required to travel, from the coverage line CL to the medium facing surface is preferably approximately 5 μm. In the case of this range, the plasmon is considered to be well focused without attenuation.

Figure 18:
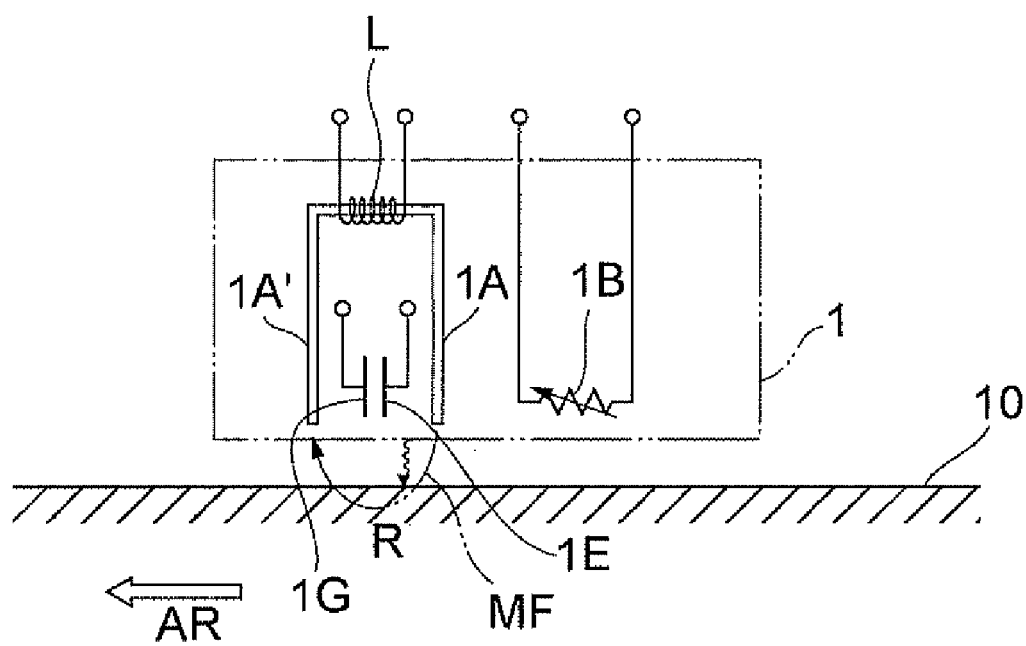
FIG. 18 is a diagram showing a circuit configuration of the magnetic head part 1 for explaining a function of a thermally assisted magnetic head.

Hereinafter, operation of the thermally assisted magnetic head according to the present embodiment will be described with reference to FIG. 18. FIG. 18 is a diagram showing a circuit configuration of the magnetic head part 1 for explaining the function of the thermally assisted magnetic head.

The main magnetic pole 1A is magnetically connected to an auxiliary magnetic pole 1A' as needed and these poles compose a magnetic circuit. When current flows between both ends of the coil L for information writing, a magnetic flux is formed in the magnetic circuit and the magnetic flux (magnetic field line) MF extends from the main magnetic pole 1A and returns to the auxiliary magnetic pole 1A'. The magnetic field line MF passes through the magnetic recording region R of the magnetic disk 10. Further, when voltage is applied across the base metal layer 1E and the upper metal layer 1G so as to flow an electron from the upper metal layer 1G to the base metal layer 1E in the information writing, the plasmon is generated as described above and the magnetic recording region R is irradiated with the near-field light.

In the drawing, the magnetic disk 10 is assumed to move in the direction indicated by the arrow AR. The magnetic field line MF extending from the main magnetic pole 1A passes through the magnetic recording region R, which has been heated with the near-field light, at the same time as the heating or slightly delayed from the heating, and thereby information writing is performed in a state of the lowered coercive force in the magnetic recording region R.

Sense current flowing in the MR element 1B depends on the magnetization direction of the magnetic information written in the magnetic disk 10 facing the MR element 1B. That is, voltage appearing across both ends of the MR element 1B, or the current flowing between the both ends change according to a value of the written magnetic information and thereby the information of the magnetic disk 10 can be read out.

Figure 9:
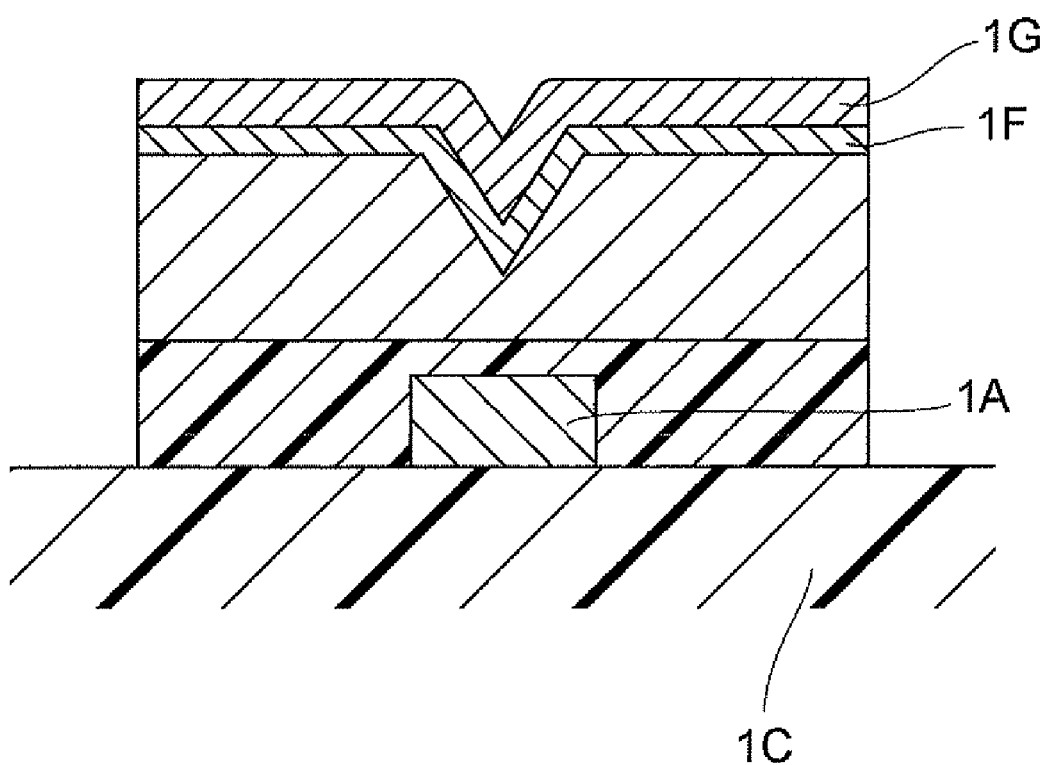
FIG. 9 is a cross-sectional view showing a variation of the magnetic head part shown in FIG. 7.

FIG. 9 is a cross-sectional view showing a variation of the magnetic head part shown in FIG. 7.

A different point of the variation from the first embodiment is that the V-shaped groove is not formed in the upper insulating layer 1D, and other structure, effect, and production method are the same as those in the first embodiment. Even in such a structure, the strong emission of the near-field light can be obtained in the vicinity of the deepest part BF of the base metal layer 1E at the exit portion EX of the medium facing surface S.

The magnetic head part according to the variation is obtained by the following process. The lower insulating layer 1C, the upper insulating layer 1D, and the base metal layer 1E are deposited sequentially without etching or the like of the surface of the upper insulating layer 1D, the V-shaped groove GR2 is formed on the surface of the base metal layer 1E by the photolithography technique, and then the intermediate insulating layer 1F and the upper metal layer 1G are deposited sequentially using a sputtering method or the like. Further, by increasing the deposition thickness of the upper metal layer 1G or by carrying out surface polishing, it is also possible to planarize the upper surface of projection PJ in the upper metal layer 1G.

Figure 10:
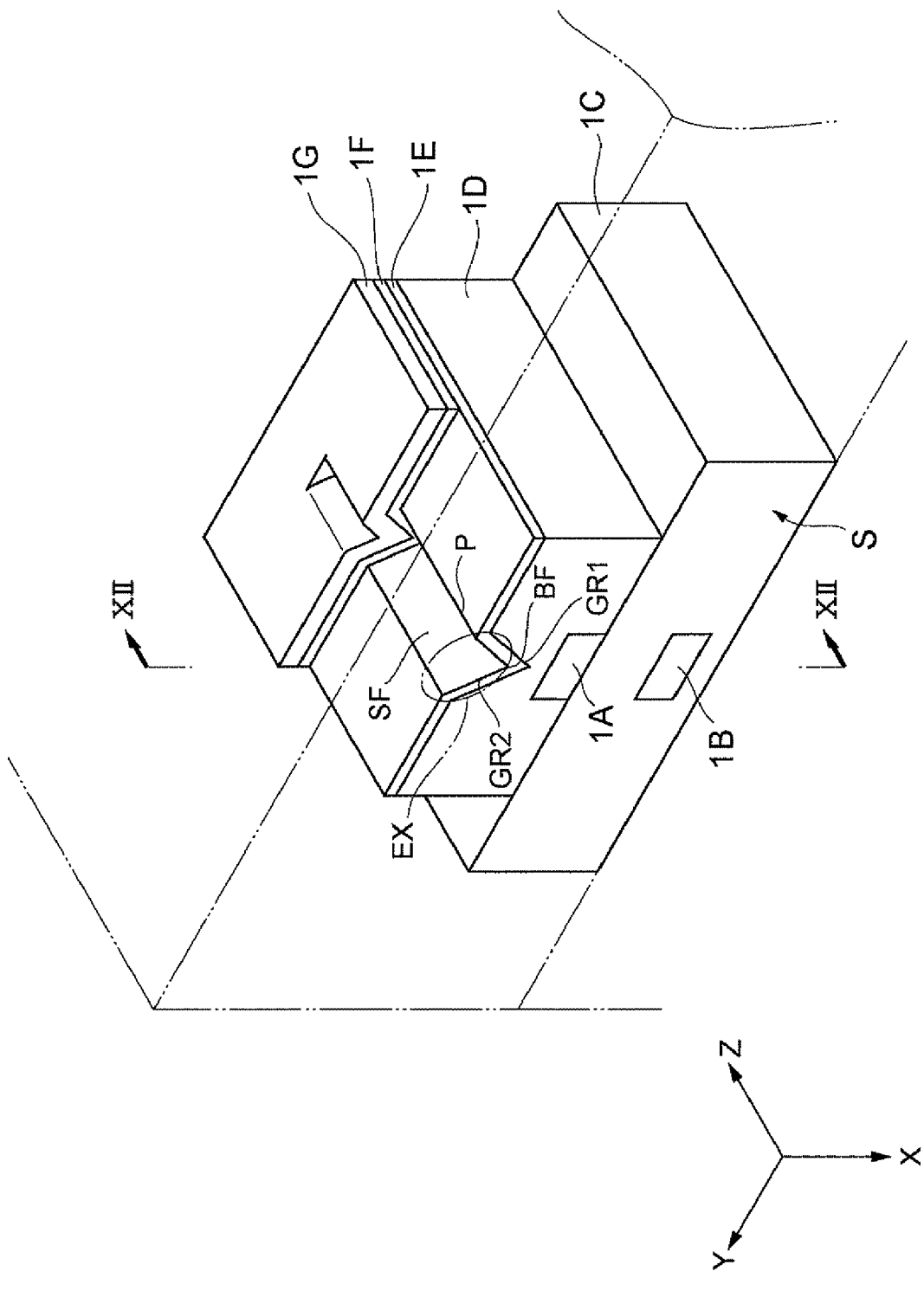
FIG. 10 is an enlarged perspective view showing a second embodiment of the magnetic head part 1 shown in FIG. 3.
Figure 11:
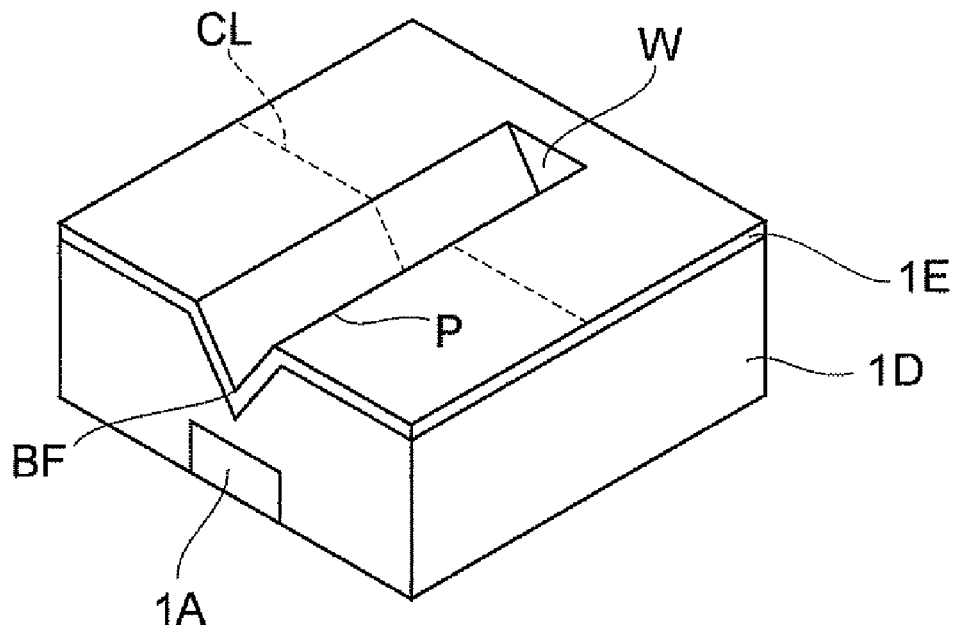
FIG. 11 is a perspective view of the magnetic head part according to FIG. 10 during production.
Figure 12:
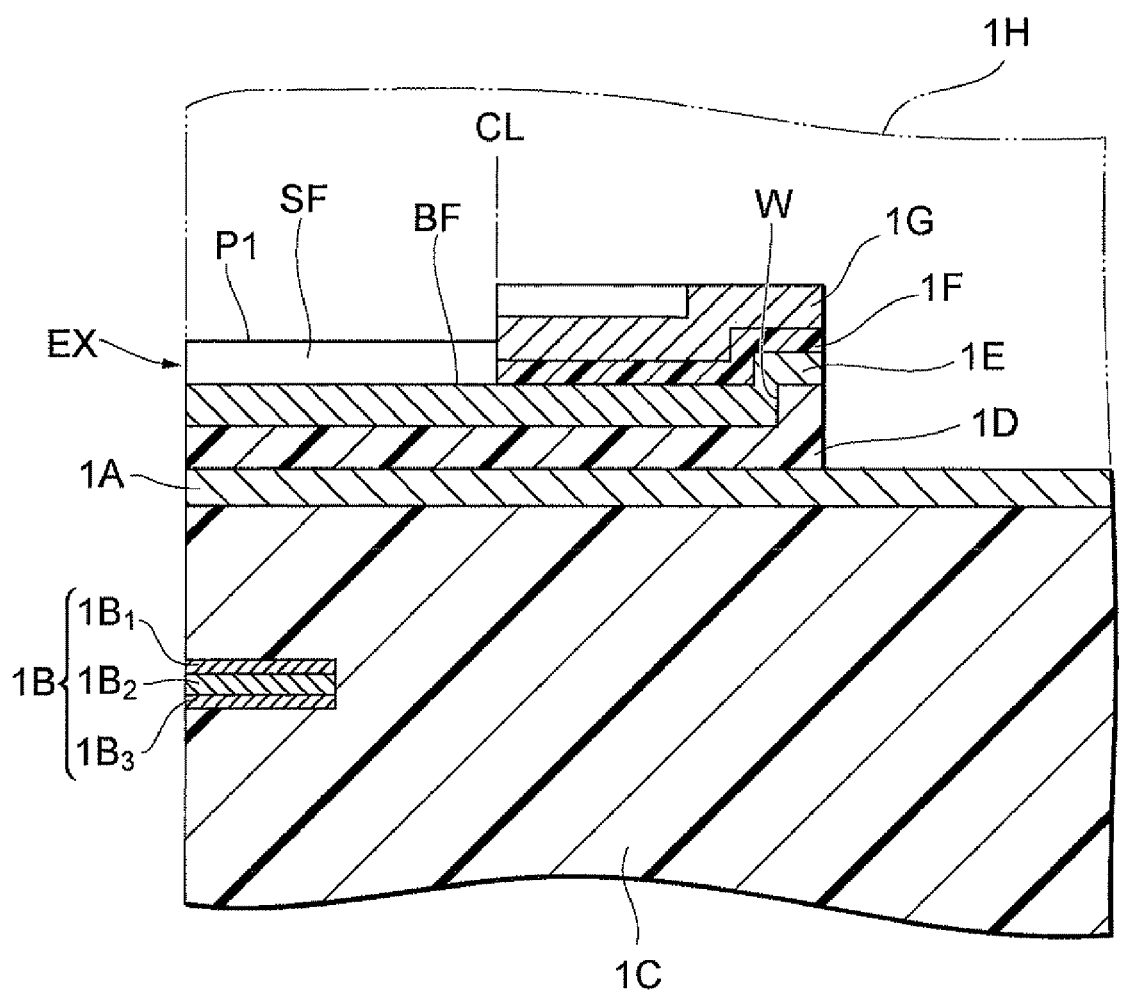
FIG. 12 is a cross-sectional view taken along the cross-section indicated by the arrows XII-XII in the magnetic head part 1 shown in FIG. 10.

(Second embodiment) FIG. 10 is an enlarged perspective view showing a second embodiment of the magnetic head part 1 shown in FIG. 3. Further, FIG. 11 is a perspective view of the magnetic head part before the deposition of the intermediate insulating layer 1F and the upper metal layer 1G. FIG. 12 is a cross-sectional view taken along the cross-section indicated by the arrows XII-XII in the magnetic head part 1 shown in FIG. 10.

A different point of the second embodiment from the first embodiment is that a step is provided in the end of the near-field light generator in the region inside the thermally assisted magnetic head 1 than the coverage line CL, and other structure, effect, and production method are the same as those in the first embodiment.

The end on the opposite side in the groove GR2 is provided with a wall surface W standing from the bottom including the deepest part BF of the groove GR2. That is, the end of the groove GR2 on the opposite side of the medium facing surface S is provided with the step having the wall surface W, and thereby the plasmon PM, which is generated at the interface between the base metal layer 1E and the intermediate insulating layer 1F by the input energy such as current, is reflected by the step provided at the end on the opposite side of the medium facing surface S and the plasmon PM is localized at one end of the groove GR2 in the exit portion EX in a further higher probability. Accordingly, by employing such a structure, it is possible to improve the generation efficiency of the near-field light.

The magnetic head part according to the second embodiment is obtained by making a resist pattern longer than the coverage line CL in the Z axis direction and also shorter than the length of the upper insulating layer 1D in the Z axis direction, in a patterning process of the surface of upper insulating layer 1D by the photolithography technique for forming the V-shaped groove.

Figure 13:
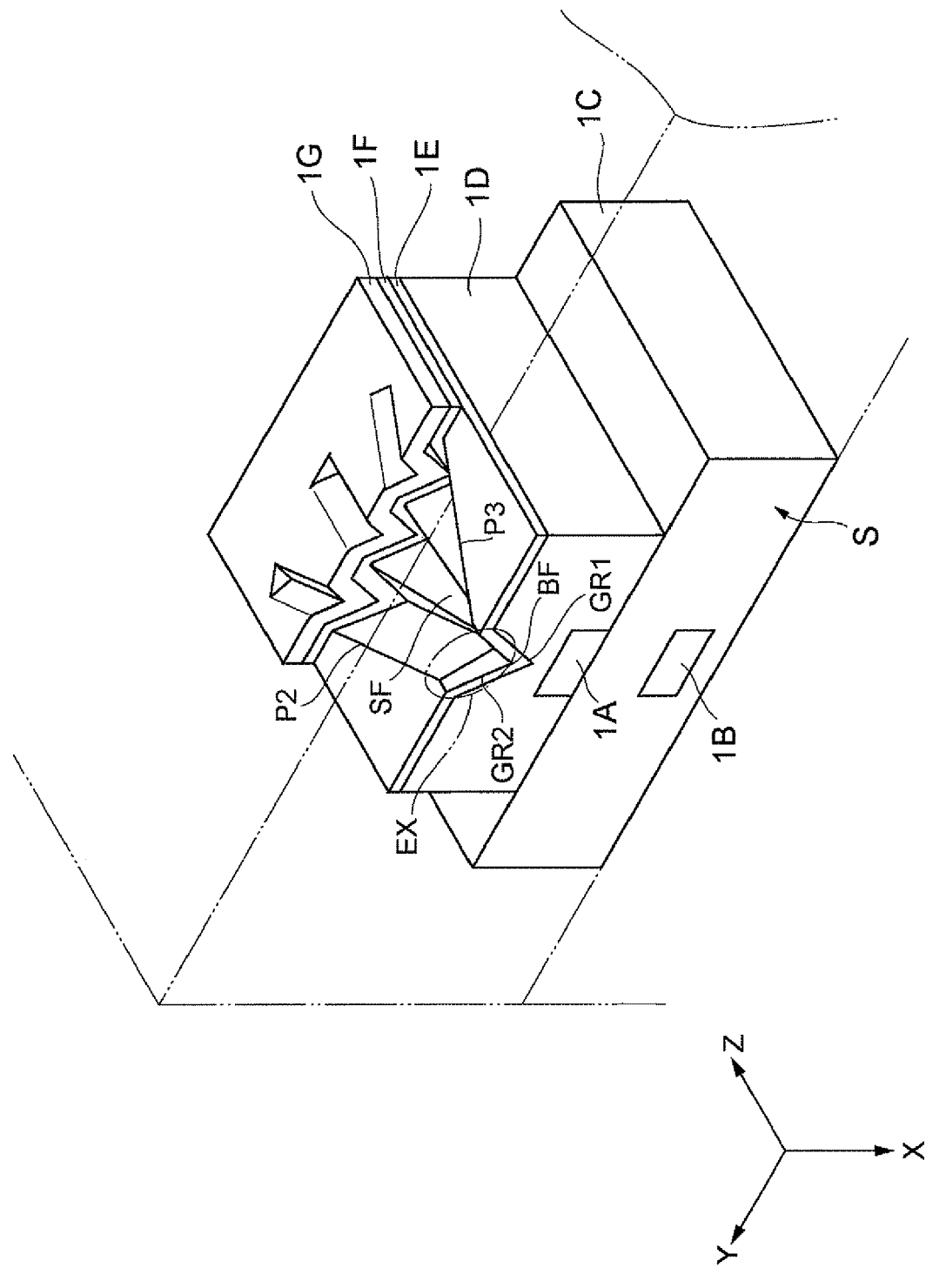
FIG. 13 is an enlarged perspective view showing a third embodiment of the magnetic head part 1 shown in FIG. 3.
Figure 14:
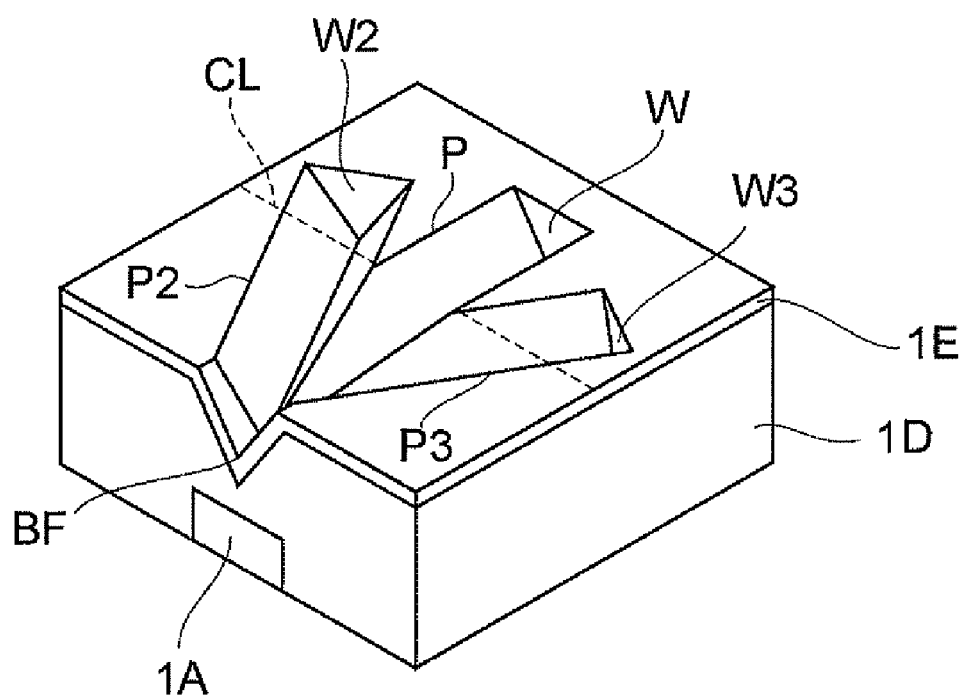
FIG. 14 is a perspective view of the magnetic head part according to FIG. 13 during production.

(Third embodiment) FIG. 13 is an enlarged perspective view showing a third embodiment of the magnetic head part 1 shown in FIG. 3. Further, FIG. 14 is a perspective view of the magnetic head part before the deposition of the intermediate insulating layer 1F and the upper metal layer 1G.

The magnetic head part 1 according to the third embodiment is different from the magnetic head part 1 of the second embodiment only in the point that the groove GR2 branches into three grooves as shown in FIG. 13. A recess region P defining the groove GR2 shown in FIG. 4 and FIG. 10 extends in the Z axis direction. In the third embodiment, a main recess region P is continuous with the branching side recess regions P2 and P3. Further, the groove GR2 in the recess regions P2 and P3 are provided with the wall surfaces W2 and W3 standing from the bottom BF of the groove GR2, respectively, at the other end where the recess regions P2 and P3 are not continuous with the recess region P.

Note that the cross-section indicated by the arrows XII-XII passing through the deepest part of the main recess region P is the same as that shown in FIG. 12, and also the cross-sectional structure of the magnetic head part 1 cut along the deepest part of the sub recess region P2 or P3 is the same as that shown in FIG. 12.

The plasmons, which are generated in the respective recess regions P, P2, and P3 at the interface between the base metal layer 1E and the intermediate insulating layer 1F, are reflected by the wall surfaces W, W2, and W3, respectively, travel along the deepest parts thereof to merge, and reach the exit portion EX positioned on the medium facing surface S. This structure has an advantage that a plurality of plasmon generating sources is provided and also traveling of the plasmons toward the opposite side of the medium facing surface S is prevented by the wall surfaces W, W2, and W3, thus increasing intensity of the near-field light at the exit portion EX.

Figure 15:
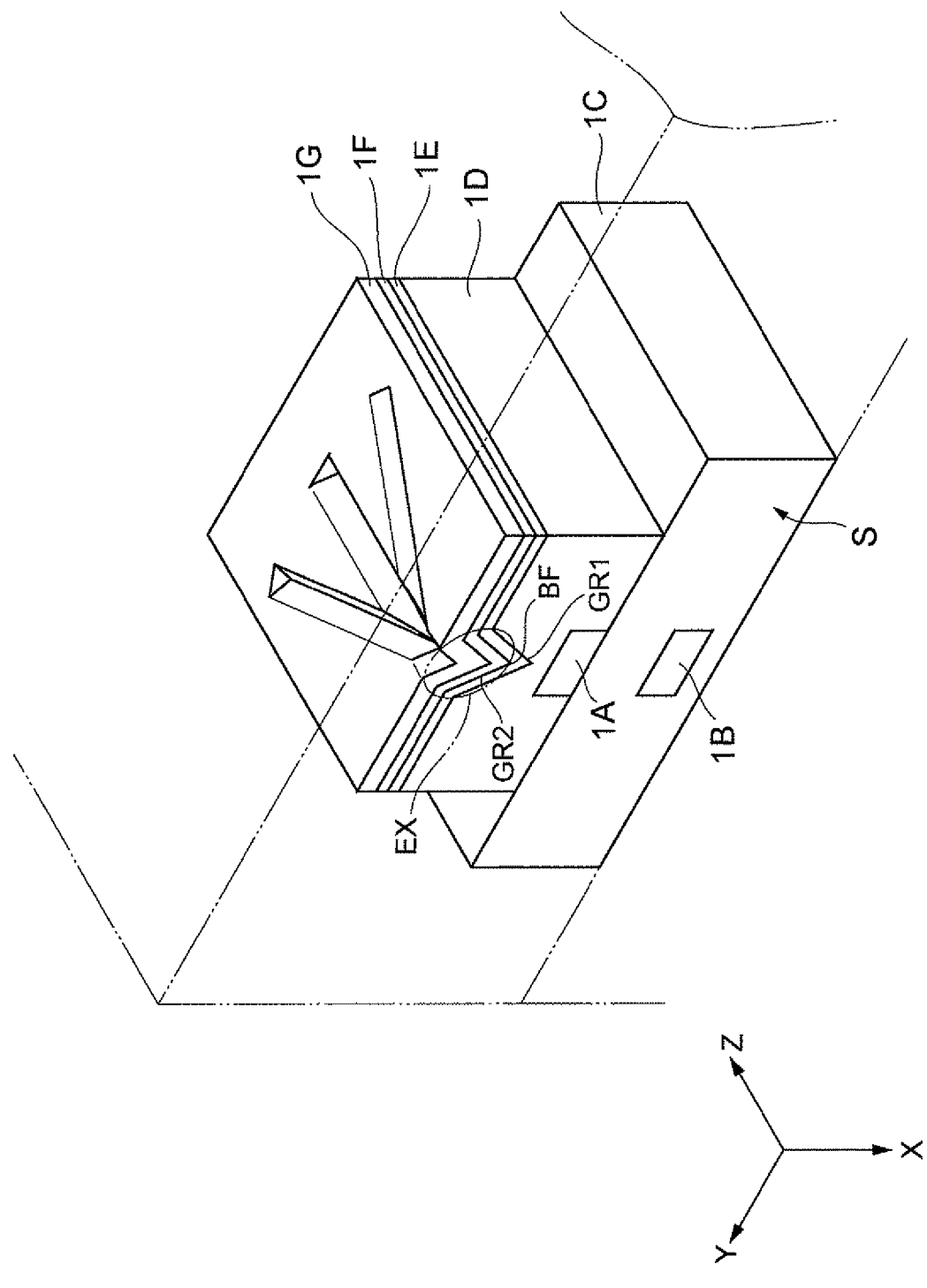
FIG. 15 is an enlarged perspective view showing a fourth embodiment of the magnetic head part 1 shown in FIG. 3.

(Fourth embodiment) FIG. 15 is an enlarged perspective view showing a fourth embodiment of the magnetic head part 1 shown in FIG. 3.

This magnetic head part 1 is one in which the intermediate insulating layer 1F and the upper metal layer 1G of the magnetic head part 1 shown in FIG. 13 are extended to the medium facing surface S. That is, the intermediate insulating layer 1F and the upper metal layer 1G exist even at the position of the exit portion EX. Even in such a structure, when voltage is applied across the base metal layer 1E and the upper metal layer 1G, the voltage is applied across the top of the projection PJ and the deepest part of the base metal layer 1E, and the plasmon is generated there and the near field light is generated from the exit portion EX on the medium facing surface S.

Since the main magnetic pole 1A is disposed near the exit portion EX, magnetic field is applied to the heated magnetic recording region from the main magnetic pole 1A as described above and the information writing is carried out. This structure has an advantage to make the plasmon generation area wider and to strengthen the intensity of the near-field light emitted from the exit portion EX, since the intermediate insulating layer 1F and the upper metal layer 1G are extended to the medium facing surface S. Note that, while the near-field light generator is provided in the vicinity of the main magnetic pole 1A, this "vicinity" is a position where the main magnetic pole 1A can apply the magnetic flux before the magnetic recording region heated by the near-field light cools down, preferably in a state keeping a spacing distance of 30 nm or shorter, for example, on the medium facing surface.

Figure 16:
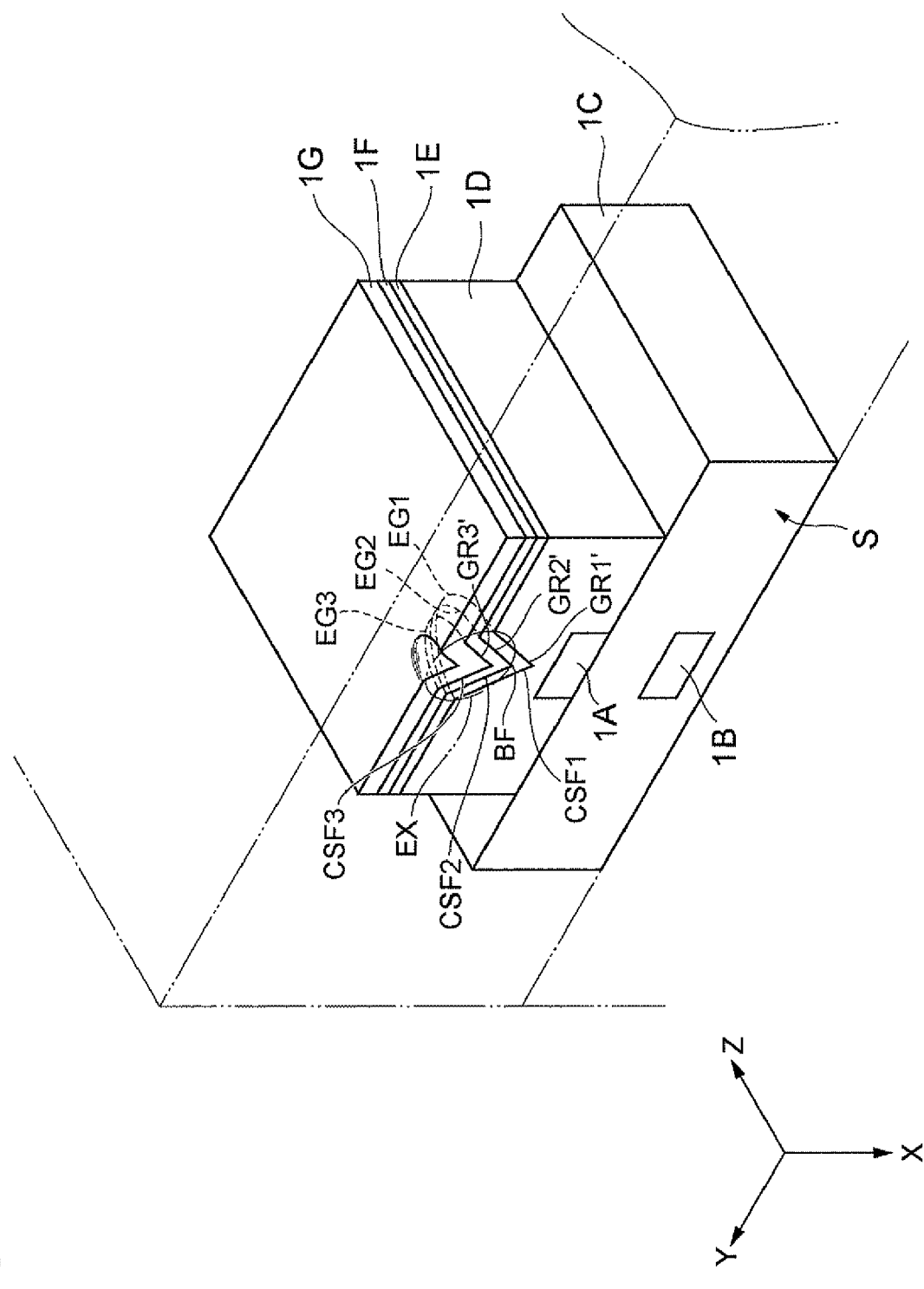
FIG. 16 is an enlarged perspective view showing a fifth embodiment of the magnetic head part 1 shown in FIG. 3.

(Fifth embodiment) FIG. 16 is an enlarged perspective view showing a fifth embodiment of the magnetic head part 1 shown in FIG. 3.

The upper insulating layer 1D is provided with a cone-shaped recess GR1' replacing the groove GR1, and the recess GR1' has a semi-circular edge EG1 at the open end as viewed in the X axis direction and has a side wall of a cone surface CSF1 which extends from the edge EG1 toward the deepest part of the recess GR1'.

The base metal layer 1E formed on the upper insulating layer 1D is provided with a cone-shaped recess GR2' replacing the groove GR2, and the recess GR2' has a semi-circular edge EG2 at the open end as viewed in the X axis direction and has a side wall of a cone surface CSF2 which extends from the edge EG2 toward the deepest part of the recess GR2'.

The intermediate insulating layer 1F formed on the base metal layer 1E is provided with a cone-shaped recess GR3' replacing the groove GR3, and the recess GR3' has a semi-circular edge EG3 at the open end as viewed in the X axis direction and has a side wall of a cone surface CSF3 which extends from the edge EG3 toward the deepest part of the recess GR3'.

The upper metal layer 1G is formed on the intermediate insulating layer 1F and embedded in the recess GR3'. The upper metal layer 1G is provided with the projection PJ facing the deepest part of the recess GR2' in the base metal layer 1E. The upper metal layer 1G has a flat potion continuous with the circumference of the projection PJ, and this region can be connected with bonding wires or various kinds of wires which electrically connect the upper metal layer 1G to an external circuit. Note that the base metal layer 1E may also be electrically connected to the external circuit by providing an appropriate contact hole in the intermediate insulating layer 1F and the upper metal layer 1G and then by embedding a metal contact within this contact hole via an insulating film.

Note that, although the upper metal layer 1G has a cone-shaped hollow on the upper surface thereof, this hollow can be made flat by increase in the thickness of the upper metal layer 1G.

When voltage is applied across the base metal layer 1E and the upper metal layer 1G, the voltage is applied across the top of the cone-shaped projection PJ and the deepest part of the base metal layer 1E, the plasmon is generated there, and the near-field light is generated from the exit portion EX on the medium facing surface S. Since the main magnetic pole 1A is disposed near the exit portion EX, the heated magnetic recording region is applied with magnetic field from the main magnetic pole 1A as described above, and the information writing is carried out.

Note that, although laser beam is not used in the above embodiments, the laser beam may be further irradiated to the base metal layer 1E to act on the plasmon at the exit portion EX.

What is claimed is:

1. A thermally assisted magnetic head, comprising:
   a main magnetic pole configured to write; and
   a near-field light generator provided near the main magnetic pole, wherein the near-field light generator includes:
   a first metal layer;
   a second metal layer; and
   an insulating layer interposed between the first metal layer and the second metal layer,
   the first metal layer having a V-shaped recess and also the second metal layer having a projection facing the deepest part in the recess of the first metal layer, in a vertical cross-section parallel to a medium facing surface,
   wherein the recess of the first metal layer is a groove, the deepest part extending from the medium facing surface toward the inside of the thermally assisted magnetic head.

2. The thermally assisted magnetic head according to claim 1, wherein end of the groove on the side opposite the medium facing surface is provided with a step.

3. A head gimbal assembly, comprising:
   a thermally assisted magnetic head according to claim 1; and
   a suspension to which the thermally assisted magnetic head is attached.

4. A hard disk apparatus, comprising:
   a head gimbal assembly according to claim 3; and
   a magnetic recording medium facing the medium facing surface of the thermally assisted magnetic head.

* * * * *